United States Patent Office 2,873,188
Patented Feb. 10, 1959

2,873,188

PROCESS AND AGENT FOR TREATING FERROUS MATERIALS

Chester E. Bieniosek, Jersey City, N. J., assignor to Union Carbide Corporation, a corporation of New York No Drawing. Application February 10, 1956
Serial No. 564,631

6 Claims. (Cl. 75—130)

This invention relates to the treating of ferrous metals. More particularly the invention relates to the addition of materials to iron or steel, as for example the addition of a nodulizing agent to cast iron.

The properties of cast iron can be improved by the addition to it of nodulizing elements, commonly cerium, magnesium or both. In the presence of these elements the free graphite in cast iron tends to assume a spheroidal form, and both the tensile strength and ductility of the cast iron are increased. Nodulizing agents containing the nodulizing elements are added, suitably, by injecting them in the form of a powder into molten cast iron. Among the powdered nodulizing agents which are injected into cast iron are magnesium ferrosilicon and cerium-containing magnesium ferrosilicon. Difficulties are experienced when powdered agents, such as the two mentioned, having a low melting point are injected into molten cast iron. To insure an efficient utilization of the materials it is necessary to inject them through a tube below the surface of the molten iron. Plugging of the tube by the softening and agglomerating of the nodulizing agent makes the injection of sufficient quantities of the agent difficult and in some instances impossible.

It is the principal object of the present invention to provide an improved method for injecting agents having a low melting point into molten ferrous materials. Another object is to provide an improved process and treating agent for nodulizing cast iron. Another object is to provide an improved process and treating agent for the injection of nodulizing agents into cast iron.

According to the prior art relating to nodulizing cast iron the difficulties attributable to the softening and agglomerating of materials during their injection into molten iron may be overcome by mixing refractory substances with the powdered nodulizing agent. The prior art techniques give satisfactory results in many instances, but the large amount of powdered refractories conventionally employed adds to the treatment time, the cooling of the cast iron, and the cost of the nodulizing treatment.

The treating agent of the invention is formed by mixing a comminuted addition agent, for example a nodulizing or alloying agent with a comminuted refractory material having a particle size of not more than 200 mesh. The amount of the refractory material required for the treating agent of the invention varies inversely with the size of the other particles. No advantage is obtained with amounts of refractory over 10% by weight. With alloying or nodulizing agents having particle sizes of between 14 and 100 mesh, 3% to 5% of the refractory material is satisfactory.

The preferred nodulizing treating agent of the invention contains 75 parts by weight cerium-bearing magnesium ferrosilicon, 25 parts by weight calcium silicon, both having a particle size of between 14 and 65 mesh, and 5 parts by weight magnesium oxide, having a particle size of not more than 325 mesh.

In the process of the invention the powdered treating agent is entrained in a gas stream and injected into molten ferrous materials through a tube, suitably of graphite. For the nodulization of cast iron an inert gas, for example argon, is preferably employed as the entraining gas.

The treating agent of the invention is prepared by blending the comminuted constituents as by tumbling. The small particles of the refractory substance coat the relatively larger particles in the treating agent. In preparing the preferred nodulizing agent containing cerium-bearing magnesium ferrosilicon, calcium silicon and magnesium oxide described above, the comminuted constituents were tumbled for about ten minutes. The magnesium oxide forms a coating on the larger particles which is not significantly affected by the transportation of the materials by conventional means.

The quantities of treating agent which are required to nodulize cast iron are influenced by a number of factors. The greater the degree of nodulization desired in the treated cast iron the greater the amount of treating agent needed. The composition of the cast iron to be treated also has an important bearing on the quantity of treating agent to be used. These factors will be understood by those skilled in the art since the amount of nodulizing element which must be retained in the cast iron to impart to it the desired properties is not changed by the use of the treating agent of the invention.

In many instances it is desirable that the treating agent of the invention for nodulizing cast iron contain an inoculant, e. g. calcium silicon or ferrosilicon, in addition to a refractory material and the nodulizing element, e. g. cerium or magnesium. The inoculant could, of course, be omitted from the treating agent and a separate inoculation performed. If an inoculant is included in the treating agent, the following proportions of materials have been found to give excellent results: at least 50 parts by weight of a material containing a nodulizing element, for example magnesium ferrosilicon and cerium-bearing magnesium ferrosilicon, up to 50 parts by weight of an inoculant, for example ferrosilicon and calcium silicon, and not more than 10 parts magnesium oxide.

A treating agent of the invention for nodulizing cast iron was tested on a number of different cast irons. Data from these tests appear in Table I. In the tests the treating agent used was 75 parts cerium-bearing ferrosilicon (2% cerium, 8% magnesium), 25 parts calcium silicon (both between 14 and 65 mesh in size), and 5 parts magnesium oxide (not more than 325 mesh in size). The treating agent was entrained in a stream of argon and injected into the molten cast iron through a graphite tube. About 250 pounds of metal was treated.

*Table 1*

| Test No. | Amount of Treating Agent (lb.) | Retained, Percent | | As Cast | | Annealed | |
|---|---|---|---|---|---|---|---|
| | | Mg. | Ce | Tensile Strength (p. s. i.) | Elongation, Percent | Tensile Strength (p. s. i.) | Elongation, Percent |
| 1 | 3.5 | 0.024 | 0.02 | 92,700 | 6.5 | 58,400 | 26.5 |
| 2 | 2.75 | 0.018 | 0.01 | 51,200 | 1.0 | 61,600 | 17.0 |
| 3 | 2.75 | 0.021 | 0.01 | 84,400 | 5.0 | 56,200 | 23.5 |
| 4 | 2.75 | 0.017 | 0.006 | 92,000 | 6.0 | 53,500 | 29.5 |
| 5 | 2.75 | 0.014 | 0.013 | 77,400 | 2.0 | 57,300 | 13.0 |

The high tensile strength and ductility exhibited by the treated cast irons as reported in Table 1 is attributable to the fact that the free graphite in the treated samples was at least partially converted to the nodular or pseudo-nodular form.

It will be obvious to those skilled in the art that treating agents prepared according to the teachings of the invention can be used in applications other than the nodulization of cast iron. For example, the addition of alloying materials to steel can be accomplished by comminuting the alloying materials and mixing the alloying material with a finely particulated refractory material to coat the alloying particles.

In this specification and the accompanying claims, mesh sizes used are those of the Tylor standard screen-scale sieves. Thus in the specification and claims mesh sizes and their corresponding screen openings are as follows: 325 mesh—0.044 mm. opening, 200 mesh—0.074 mm. opening, 100 mesh—0.147 mm opening, 65 mesh—0.208 mm. opening, 14 mesh—1.168 mm. opening.

In nodulizing cast iron with the treating agent and according to the process of the invention as well as with the treating agents and processes of the prior art, the sulfur content of the iron to be treated is an important factor. In general if a substantial amount of nodulization is to be obtained efficiently the sulfur content of the iron prior to the injection of the treating agent should not exceed about 0.02%. For best results the sulfur content should not exceed 0.01%. The reduction of the sulfur content of cast iron to the indicated low values may be accomplished conveniently by the injection of powdered calcium carbide into the cast iron.

What is claimed is:

1. A powdered treating agent for improving the tensile strength and ductility of cast iron, said agent comprising a mixture of a comminuted nodulizing agent, a comminuted inoculant and a comminuted refractory material, said refractory material constituting not more than 10% by weight of said mixture and having particles not more than 200 mesh in size, said refractory material forming a coating on the particles of said nodulizing agent and said inoculant, said coating shielding said treating agent from the effects of heat preliminary to its introduction into said cast iron.

2. A powdered treating agent for improving the tensile strength and ductility of cast iron, said agent comprising a mixture of a comminuted nodulizing agent, a comminuted inoculant and comminuted magnesium oxide, said magnesium oxide constituting not more than 10% by weight of said mixture and having particles of not more than 200 mesh in size, said magnesium oxide forming a coating on the particles of said nodulizing agent and said inoculant, said coating shielding said treating agent from the effects of heat preliminary to its introduction into said cast iron.

3. A powdered treating agent for improving the tensile strength and ductility of cast iron, said agent comprising a mixture of at least 50 parts by weight of a comminuted nodulizing agent, a comminuted inoculant in an amount not exceeding 50 parts by weight, and magnesium oxide in an amount not exceeding 10 parts by weight, said nodulizing agent and inoculant having a particle size of between 14 and 100 mesh, said magnesium oxide having a particle size of not more than 200 mesh, said magnesium oxide being so disposed as to constitute a heat shielding coating on the particles of said nodulizing agent and said inoculant.

4. A process for injecting comminuted materials which tend to soften at the melting point of steel into molten ferrous metal which process comprises entraining in a stream of gas the comminuted materials which have been coated with not more than 10% by weight of particles of magnesium oxide having a size of not more than 200 mesh, and injecting said coated comminuted materials into said molten ferrous metal, whereby premature melting of said comminuted materials is substantially reduced.

5. An additive material for molten cast iron consisting of finely divided particles of nodulizing agent and inoculant having a melting point below the temperature of the molten iron and normally tending to fuse and agglomerate during passage through an injection tube and immediately prior to its admission below the surface of the molten iron, and a refractory material disposed as a coating about said nodulizing agent and inoculant, whereby fusing of said nodulizing agent and inoculant in said tube is substantially eliminated.

6. In the process of the producing nodular cast iron wherein a nodulizing agent, an inoculant and a refractory material are injected in powder form through an injection tube below the surface of a molten bath of cast iron and wherein said injection tube is subject to plugging by fusing of the particles of said nodulizing agent and inoculant therein, the improvement comprising coating the particles of said nodulizing agent and said inoculant with said refractory material, thereby shielding said nodulizing agent and said inoculant from the radiant heat effects of the molten iron during transit through said injection tube.

References Cited in the file of this patent

UNITED STATES PATENTS

| | | |
|---|---|---|
| 2,574,581 | McKinney et al. | Nov. 13, 1951 |
| 2,671,019 | Du Rostu | Mar. 2, 1954 |
| 2,747,990 | Morrogh | May 29, 1956 |

FOREIGN PATENTS

| | | |
|---|---|---|
| 514,115 | Belgium | Sept. 30, 1952 |
| 1,116,581 | France | Feb. 6, 1956 |